United States Patent
Manoharan et al.

(10) Patent No.: US 6,627,101 B2
(45) Date of Patent: Sep. 30, 2003

(54) MAGNETO CONDUCTIVE POLYMER COMPOSITE AND PROCESS FOR THE PREPARATION OF THE SAME

(75) Inventors: Solomon Sundar Manoharan, Uttar Pradesh (IN); Manju Lata Rao, Uttar Pradesh (IN)

(73) Assignee: Indian Institute of Technology, Uttar Pradesh (IN)

( * ) Notice: Subject to any disclaimer, the term of this patent is extended or adjusted under 35 U.S.C. 154(b) by 64 days.

(21) Appl. No.: 09/829,410

(22) Filed: Apr. 9, 2001

(65) Prior Publication Data

US 2002/0060305 A1 May 23, 2002

(30) Foreign Application Priority Data

Sep. 22, 2000 (IN) ................................. 859/00

(51) Int. Cl.$^7$ ................................. H01F 1/00
(52) U.S. Cl. ................................. 252/62.54; 252/62.55
(58) Field of Search ................................. 252/62.54, 62.55, 252/62.51 C (56) References Cited

U.S. PATENT DOCUMENTS 6,143,413 A * 11/2000 Kamei et al. ................ 428/408

* cited by examiner

Primary Examiner—C. Melissa Koslow
(74) Attorney, Agent, or Firm—Ladas & Parry (57) ABSTRACT

A magnetic polymer composite comprising 60–90% by weight of the polymer, 10–40% by weight of magneto-resistive alloys and 5–30% by weight of the additive prepared by the process by dissolving 60–90% by weight of the polymer in a solvent to obtain a clear, colorless solution; adding 10–40% by weight of alloy and 5–30% by weight of the additive in the said clear color less solution; agitating the said clear, color less solution at a frequency of 15–20 kHz for a period of 5–30 minutes, to get equally dispersed alloy in the said polymer solution; transferring the said polymer solution with equally dispersed said magneto-resistive alloys and additive to the open non-metallic container on a magneto-stirrer allowing the said solvent to evaporate till the polymer coated transition metal based alloys are isolated in the form of cones from the said non-metallic container.

11 Claims, 9 Drawing Sheets

MAGNETO CONDUCTIVE POLYMER COMPOSITE AND PROCESS FOR THE PREPARATION OF THE SAME

FIELD OF INVENTION

The present invention relates to a magneto-conductive polymer composite and the process for the preparation of the same for read and write head for use in magnetic storage devices.

The present invention relates to a process for the preparation of magneto-conductive polymer composite comprising magnetic transition metal based alloy, a processable polymer capable of exhibiting magneto resistive properties and an additive to provide the conductivity property.

The embodiment of the invention resides in providing a method wherein the magnetic polymer composite is prepared having conductive as well as magnetic properties.

BACKGROUND OF THE INVENTION

Prior Art

E. F. Fullerton, Applied Physics Letters, Vol. 63 (12), p. 1699–1701 (1993) teaches that conventional magnetoresistive materials like Permalloy have a positive MR ratio of a few percent while 150% magnetoresistance in sputtered Fe/Cr (100) superlattices.

P. M. Lev, in Science, Vol. 256, p.973,(1992) explains that high MR values at low temperature (typically below 50K) were also observed in $Eu_{1-x}Gd_xSe$. Values of MR substantially larger (in absolute values) than those of the conventional materials are usually referred to as "Giant" MR.

K. Chahara et al. Applied Physics Letters, Vol.63 (14), pp.1990–1992, (1993) disclose a ratio of −53% in $La_{0.72}Ca_{0.25}MnO_3$. The material exhibited essentially zero MR at room temperature. R. Von Helmholt et al. Physics. Review Letters, Vol. 71(14) pp. 2331–2333(1993) report the observation of a room temperature MR of −150% at room temperature, in thin films, the of (MR) material permalloy film which has a rate of change in resistance of perovskite-like $La_{0.67}Ca_{0.33}MnO_3$. As deposited films were paramagnetic, but after subsequent heat treatment (900 C in air, 12 hrs) the samples exhibited a ferromagnetic magnetization curve. Bulk samples of that composition are known to be metallic ferromagnets, with Curie temperature of 343K, but small MR ratio.

Materials exhibiting magnetoresistive ratios greater than a few percent are useful in a variety of devices. Such devices utilize the resistive changes of the magnetoresistive materials, to the small changes in an applied magnetic field. This effect is useful in sensing devices, current sensing devices, memory elements and the like. U.S. Pat. Nos. 5,450,372 and 5,461,308 teach about the above mentioned useful device.

Although a Ni—Fe alloy thin film (permalloy thin film) is conventionally used with a magnetoresistive ratio of 2 to 3%. To comply with the requirements to narrow the track of a magnetic head and increase the resolution of a magnetic sensor, a magnetoresistive material having a higher rate of change in resistance (MR ratio) is demanded. The phenomenon refered to as "giant magnetoresistive (GMR) effect" has recently been found in Fe/Cr or Co/Cu multilayer thin films (refer to M. N. Baibich et al., Physical Review Letters, Vol. 61 (1988), p2472, D. H. Mosca et al., Journal of Magnetism and Magnetic Materials, Vol. 94 (1991), p L1). It is considered that, in such thin films, spin dependent scattering caused by conduction electrons located in the interface between Fe and Cr or Co and Cu contributes to the giant magnetoresistive effect. These films basically differ from conventional Ni—Fe thin films in the generation mechanisim of the magnetoresistive effect. Although a MR ratio of 10% or more is obtained from these thin films, the need for the films to have a multi-layer structure complicates the fabrication process therefore.

A. E. Berkowitz et al., Pysical Review Letters, Vol. 68(1992), p3745, J. Q. Xiao et al., Physical Review Letters, Vol. 68(1992), p3749 indicates that magnetoresistive effect was observed in a single-layer thin film in which ultrafine Co, Fe or Ni grains (grain size: a few nm) are precitated in a Cu or Ag matrix.

Magnets are well known feature having a wide range of applications in using permanent (hard) or non-permanent magnets. The magneto resistive features are found mainly in two classes of compounds as ferromagnetic alloys and rare earth manganites. However, it has been observed that in both the cases, when the magnetic field is applied, there is remarkable drop in resistance. In the case of ferromagnetic alloys, the resistance varies with the thickness of the spacer and/or the non-magnetic layer, while in case of rare earth manganites, the resistance varies at the magnetic transition temperature. The ferromagnetic alloys in particular exhibit this behaviour when fabricated as multilayers with alternate stackings of magnetic and non-magnetic layers such as Fe—Cr, Co—Cu, systems. The magnitude of magneto resistance varies as a function of layer thickness of Cr or Cu. However, magneto resistance in Ag—Co system shows that the granular giant magneto-resistance is also observed wherein clusters of cobalt are dispersed in a non-magnetic matrix such as silver.

Electrically conducting polymer composite material exhibiting positive temperature coefficient of resistance is known in the art. However, polymer composite exhibiting both positive temperature coefficient of resistance and magneto-resistive effect is not known in the art. Hence, the conducting polymer composite materials consisting of a random distribution of a conducting filler throughout an insulating polymer are of interest for several applications.

Therefore there remains a need to have a material which exhibits higher MR at room temperature with increased device sensitivity, potential and enhanced reliability. It has been our object to provide a magneto-conductive polymer.

The object of the invention is to fabricate the magneto conductive polymer composite by isolating the components in the form of cones having effective coating of each particle of the magnetic alloys with the layer of polymer.

BRIEF SUMMARY OF THE INVENTION

In the subject invention, the analogy of fabricating new systems wherein ferromagnetic compounds are dispersed in a non-magnetic, non-conducting polymer matrix have been developed by proper tailoring of the composite to aid percolation between such particles to obtain ferromagnetic behaviour in such composites.

The Cr is having anti-ferromagnetic property which brings about an anti-ferromagnetic coupling between Fe atoms, making Fe—Cr alloys having magneto-resistive property resulting in the drop of Curie temperature of the Fe as an increase of the Cr doping. Such alloys can be used as conducting fillers in an insulating polymer matrix having electrical, magnetic and magneto-resistive behaviour.

The present invention is directed to a method for preparing polymer coated magnetic alloys preferably in the form of cones obtained by dissolving the processable polymer in a solvent and dispersing the alloy in the powder form by agitating the mixed polymeric solution and addition of an additive in the form of powder added to the said polymeric solution followed by solidification of the polymer coated alloy either in the form of a powder or as oriented cones.

The polymer of the subject invention to be coated on the magnetic alloy particles is vinyl-keto polymer. The subject polymer is selected due to its complete solubility in the solvent.

Accordingly, the subject invention relates to a magnetic polymer composite for read and write head for use in magnetic storage devices, comprising
60–90% by weight of the polymer preferably vinyl-keto polymer;
10–40% by weight of alloy preferably magneto-resistive alloys having magnetic properties; and
5–30% by weight of the additive preferably conducting carbon having conductivity properties.

The present invention also relates to a process for the preparation of a magnetic polymer composite, comprising
(a) dissolving the 60–90% by weight of the polymer preferably vinyl-keto polymer in a solvent by stirring the same in an open atmosphere at ambient temperature to obtain a clear, colourless solution;
(b) adding 10–40% by weight of alloy preferably magneto-resistive alloys in the said clear colour less solution;
(c) simultaneously adding 5–30% by weight of the additive preferably conducting carbon having conductivity properties in the said clear colour less solution
(d) agitating the said solution obtained from step (c) at frequency of 15–20 kHz for a period of 5–30 minutes, to get equally dispersed alloy in the said polymer solution;
(e) transferring the said polymer solution with equally dispersed said magneto-resistive alloys to the open non-metallic container on a magneto-stirrer allowing the said solvent to evaporate till the polymer coated transition metal based alloys are isolated in the form of cones from the said non-metallic container.

The said dissolution and mixing of the polymeric material results in effective coating of the said alloy particles.

The said agitation is done in a sonicator and the said non-metallic container is preferably a glass container.

The polymer coated transition metal based alloy isolated in the form of cones are having dimensions up to 1.5 mm–2.5 mm length and 0.4 mm–0.66 mm width.

The said polymer and magneto-resistive alloys are used in the powder form and the polymer used is polyvinylpyrrolidone and the said magneto-resistive alloys The subject application may better be understood with reference to accompanying drawings. However, the same should not be construed to restrict the scope of the application as they are for illustrative purposes only.

BRIEF DESCRIPTION OF THE ACCOMPANYING DRAWINGS

FIGS. 4(a), 4(b) and 4(c) depict the SEM micrographs of the subject composite are selected from chromium-iron, chromium-cobalt or chromium-nickel.

DETAILED DESCRIPTION OF THE INVENTION

In the present invention, the transition metal based alloy and the vinyl-keto polymer are in the powder form and are weighed in the same ratio. In the process for the preparation of magnetic polymer composite, the magnetic alloy is added to the polymeric solution in a solvent and the mixed solution is thoroughly agitated for duration ranging from 5 to 30 minutes. The solution after thorough agitation is transferred into an open petri dish and the solvent is evaporated under the influence of a magnetic field. This results in polymer coated alloys with preferred orientation, with dimensions as mentioned earlier and subsequent grinding gives oriented powder composites.

In order to bring about connectivity in the alloy particles, otherwise isolated as a result of uniform polymers coating, a calculated amount of additive, is added in the polymeric solution and agitation was carried out. The solution is then transferred into an open dish to allow rapid evaporation of the solvent, the composite blend is then collected, finely grounded and pelletized into a 10 mm pellet, for carrying out resistivity, magnetic and Giant Magnetic Resistance measurement.

The additive are added up to 5–30%, with the addition of higher percentage of additive, the resistance drops gradually. The additive gets finely dispersed in a solution during the thorough agitation process and brings about the connectivity between the alloy particles electrically insulated as a result of polymer coating. As a result of electrical percolation between alloy particles, the resistance in the presence of a magnetic field can be measured. A substantial drop in resistance on application of magnetic field clearly demonstrates the Giant Magnetic Resistance properties in the magneto-polymer composite.

The additives used in the subject application are preferably conducting carbon in the form of powder.

In the method for preparing the magnetic polymer material of the present invention, the aforesaid vinyl-keto polymer can be effectively coated onto the alloys such as Cr—Fe Cr—Co, Cr—Ni, etc.

The choice of the solvent is an important criteria, as the polymer should not loose its identity in the chosen solvent. The kind of solvent to be used should be optionally selected depending on the kind of the polymer used. Before the agitation process a homogenous polymeric solution is ensured by tailoring the amount of polymer V/S solvent ratio.

Coating the polymer on the magnetic alloy by using the thus prepared polymer solution is carried out by adding the magnetic alloy in the powdered form according to the calculated ratio of the alloy: polymer and addition of the additive, also in the powdered form as calculated according to the ratio, Additive: alloy-polymer, by weight, followed by thorough agitation of the mixed solution of alloy and polymer in the said solvent for duration ranging from 10 to 30 minutes. Transferring the said mixed solution into an open vessel, where the magnetic polymer may be isolated in the form of cones, by orienting the magnetic-polymer particles under the influence of a magnetic field, during the course of evaporation of the solvent. Rapid evaporation of the polymeric solution results in a layer formation of the composite on the reaction vessel. These cones are carefully collected or scrapped or scooped from the surface of the said container. The said cones may be grounded thoroughly in a mortar-pestle to obtain the composite as a fine powder. The power may be pellitized using a 8–12 mm die; with an applied pressure of 4–6 tons.

Resistivity, magnetic and Giant Magnetic Resistance measurement were carried out using a pellet of dimension 10"×4.2 mm. Detailed microscopic studies have been carried out using SEM/EPMA to inspect the microstructure and chemical homogeneity respectively of alloy composite as clearly indicated in FIGS. 1–5.

In the subject process for the preparation of a magnetic polymer composite comprising of 10–40% by weight of the magnetic material (transition metal based alloy) and 60–90% by weight of the polymer having a repeating unit represented by the formula VKM. The said polymer has complete solubility in a said solvent. The method comprises of dissolution of the polymeric material in the said solvent and dispersing the magnetic transition metal based alloy using a said technique which results in effective coating of the alloy particles with the layer of the polymeric material. The polymer coated transition metal based alloy are isolated in the form of cones having dimensions up to 1.5–2.5 mm length and 0.4–0.6 mm width. The magnetic and magneto resistive features of the coated composites have interesting features resembling that of the bulk alloys. The polymer coated transition metal based alloy core has been isolated by addition of an additive to improve on the conductivity behaviour of the said particles, electrically insulated as a result of polymeric coating. The dissolution and mixing of the polymeric material results in effective coating of the alloy particles. The direct evaporation of the solvent and subsequent grinding of the cones results in obtaining the composites in the powdered form. The powdered form of the composites, has been obtained by addition of additive, in different compositions.

The percolation threshold is achieved for addition of additive >5% in the alloy-polymer composite. Magnetic studies on the magnetic-polymer composites show a systematic variation in saturation magnetization as function of field versus Temperature. Variation of magnetic properties, Ms, Br etc., at various applied field, H with variation of temperature (5K, 100K, 200K, 300 K) are also disclosed. Magnetization data of the polymer-coated alloy are comparable with the bulk material.

The important features observed is the magneto resistance feature is defined by the ratio, Delta R/Ro, showing 7.9% at 299K for the composites.

The composite in the form of cones have been isolated having the desired dimensions. The morphology of the cones using electron microscopic studies reveals spherical nature of the particles, coated with a uniform layer of the polymer. The process as herein before described and the evaporation of the solvent decides the topography/morphology of the polymer coated magnetic 'micro beads'.

The average size of the spheres as obtained from the microscopic studies is 2.5 micrometer.

The solvent used in the subject application is selected preferably from ethanol.

Figure 1:
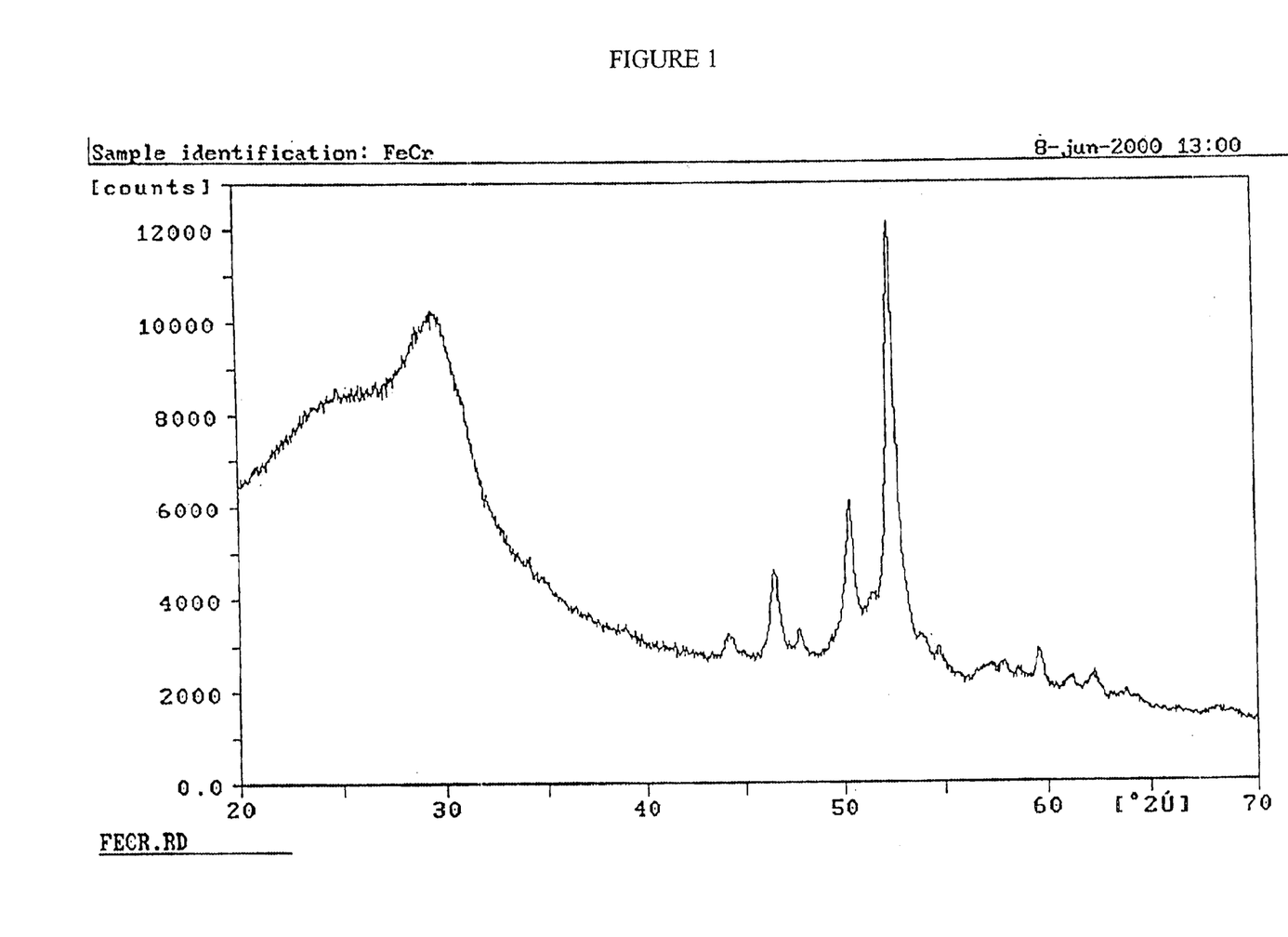
FIG. 1 depicts the X-Ray diffractogram
Figure 2A:
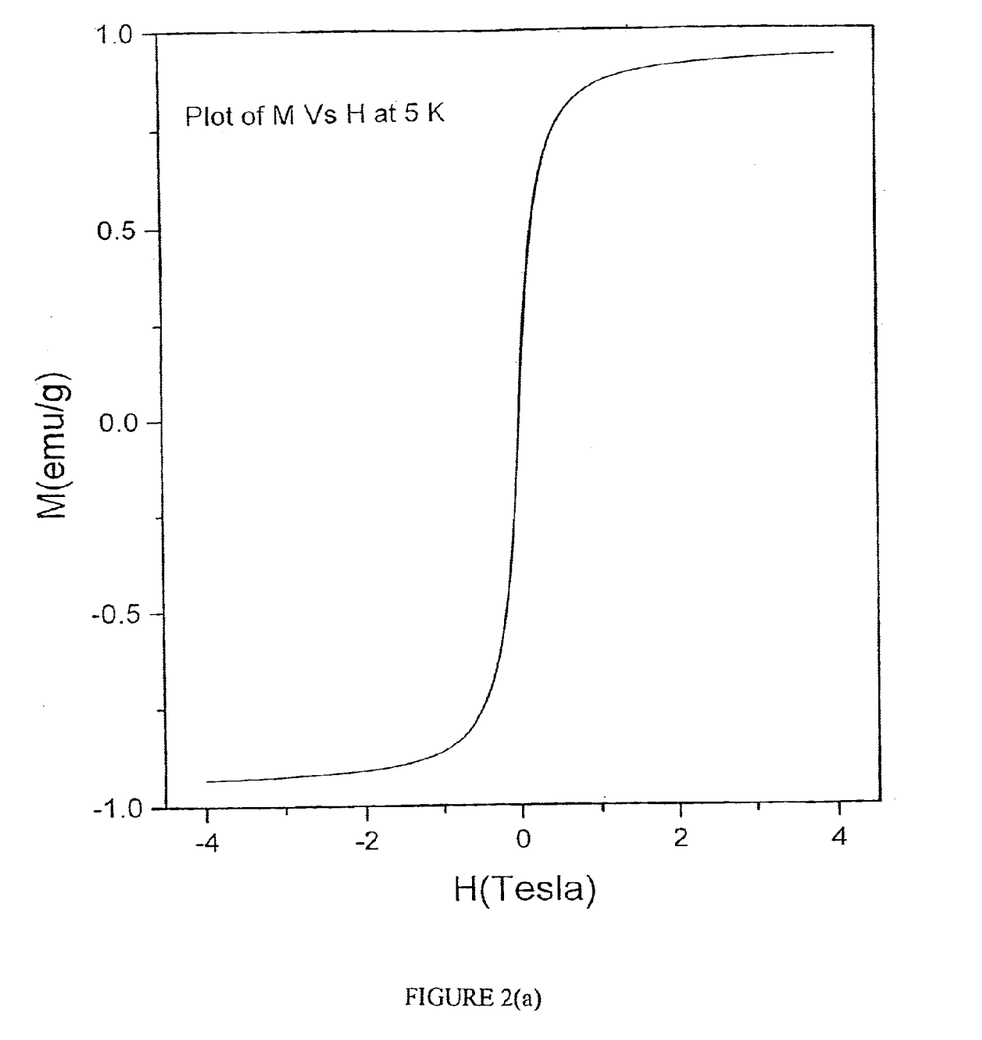
FIGS. 2(a) to 2(d) depicts the magnetic measurement
Figure 2B:
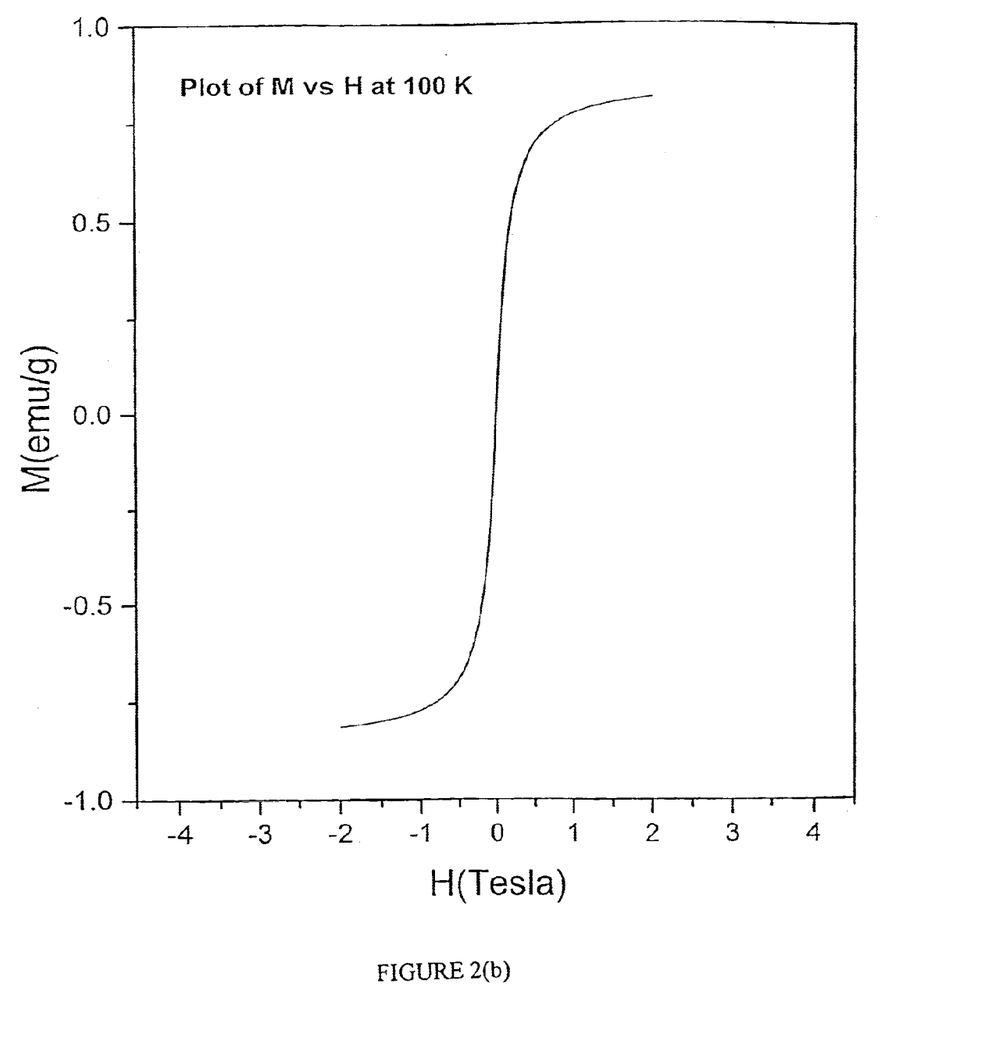
Figure 2C:
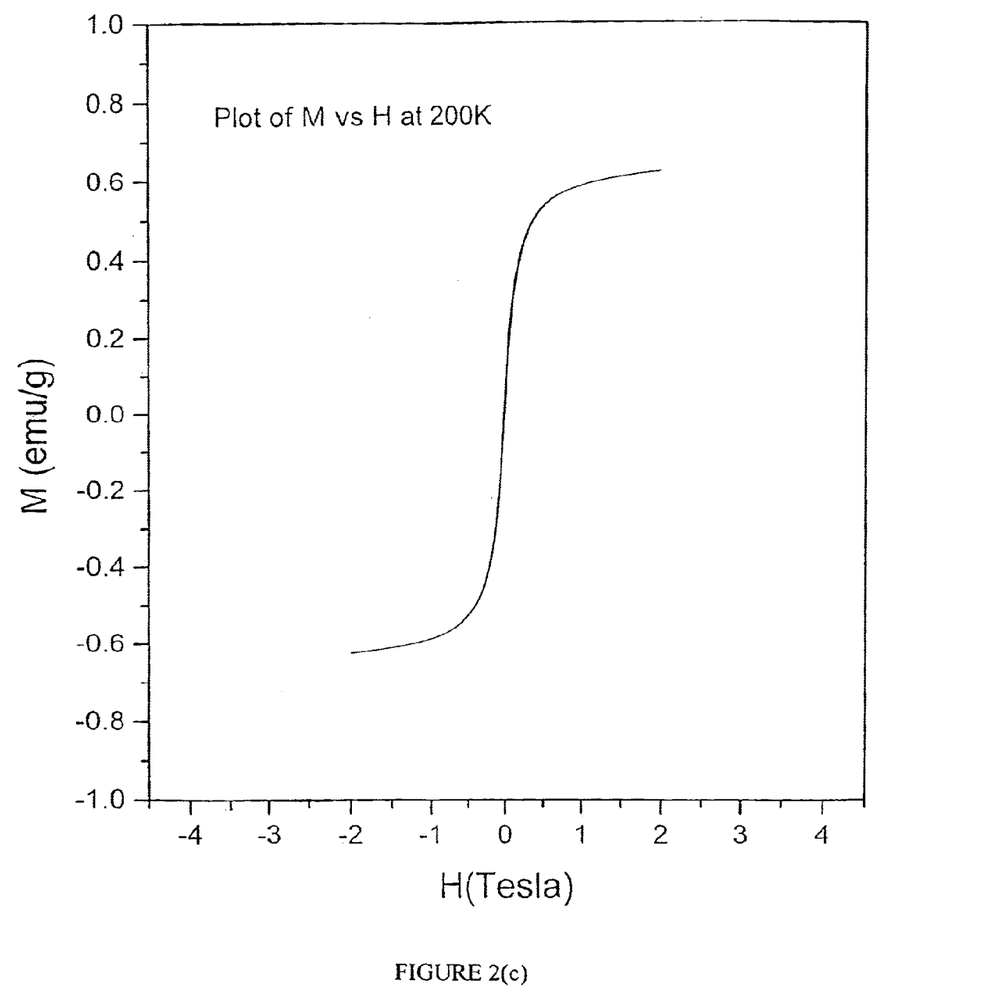
Figure 2D:
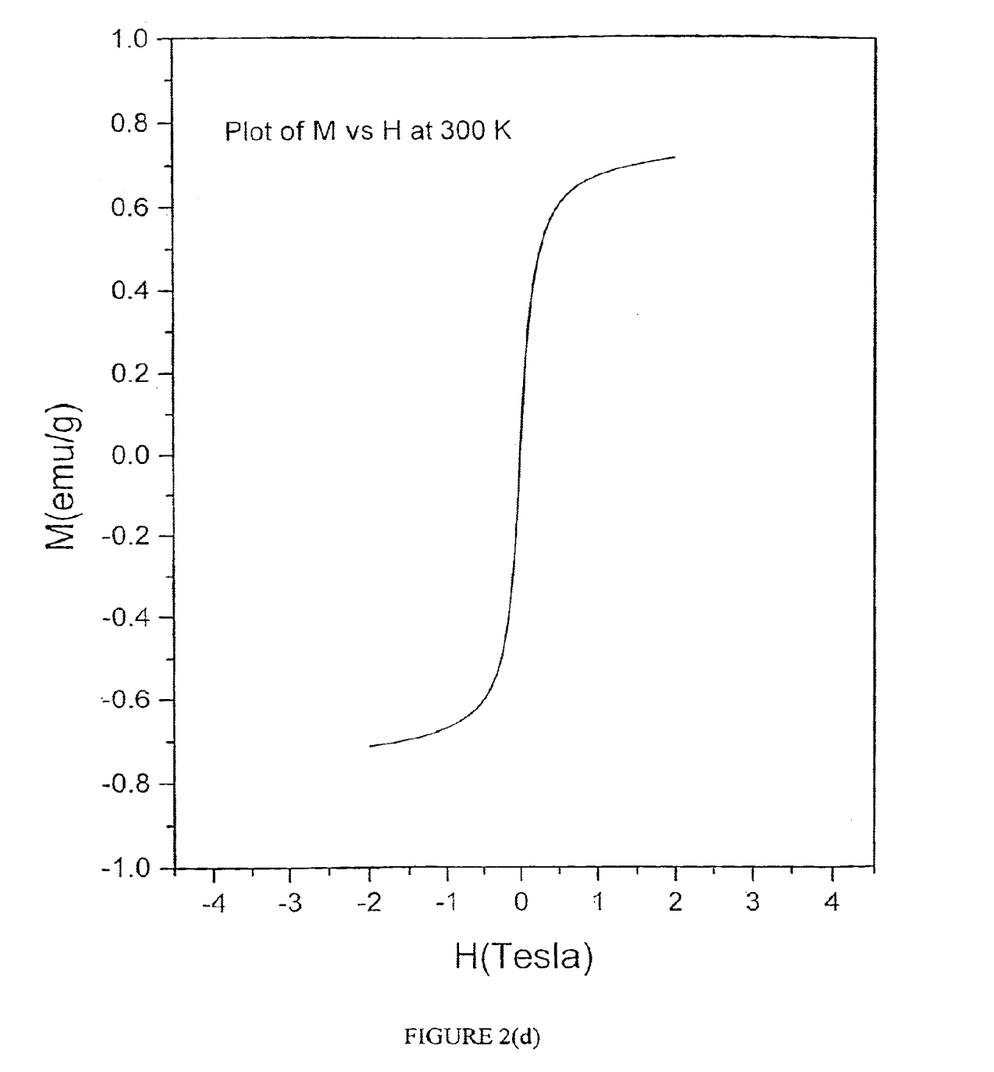

The X-ray diffractogram of the Fe—Cr polymer as shown in FIG. 1, the Fe—Cr polymer is in the range of 20–70 at 2θ degrees, using Co—$K_\alpha$ (as the source of the X-rays). The peaks in the range of 20–40 are indicative of the polymer reflections while those in the range of 45–65 are characteristics of the Fe—Cr alloy. The peak of highest intensity for the Fe—Cr alloy corresponds to the (110) reflection. The X-ray diffractogram of the alloy-polymer composite shows the characteristic reflections of both the alloy and the polymer.

Figure 3:
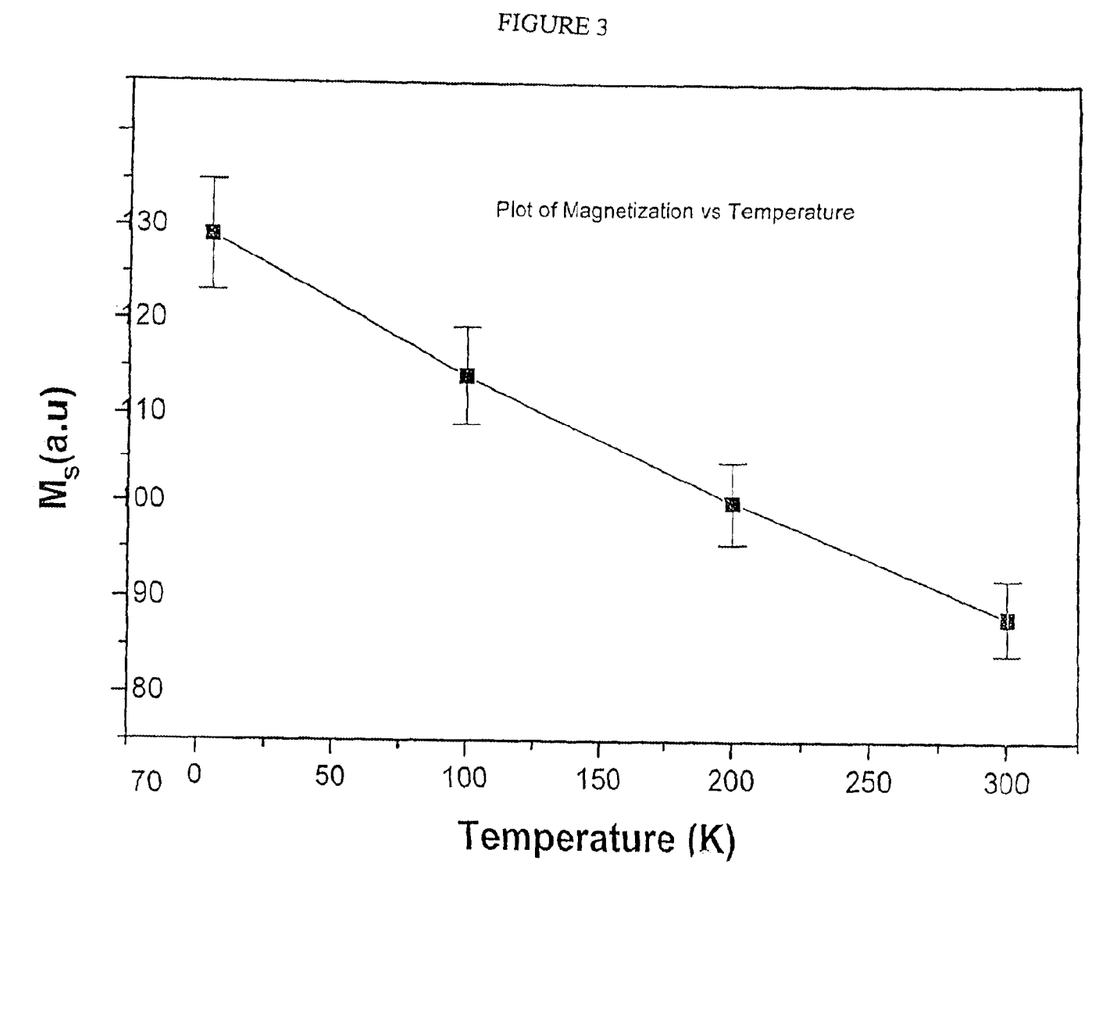
FIG. 3 depicts the graph of Magnetization Vs. Temperature

FIG. 2(a–d) shows the plot of magnetization v/s Field of temperatures at 5K, 100K, 200K and 300K respectively. The saturation magnetization of the magnetic polymer decreases with increase in temperature. This systematic drop in the Ms value with increase in temperature is reflected in the plot of saturation magnetization v/s temperature as shown in FIG. 3, where the plot of Magnetization v/s Temperature value is observed to be linear. A systematic drop in the saturation magnetization value is observed with increase in temperature from 5K to 300K.

Figure 4A:
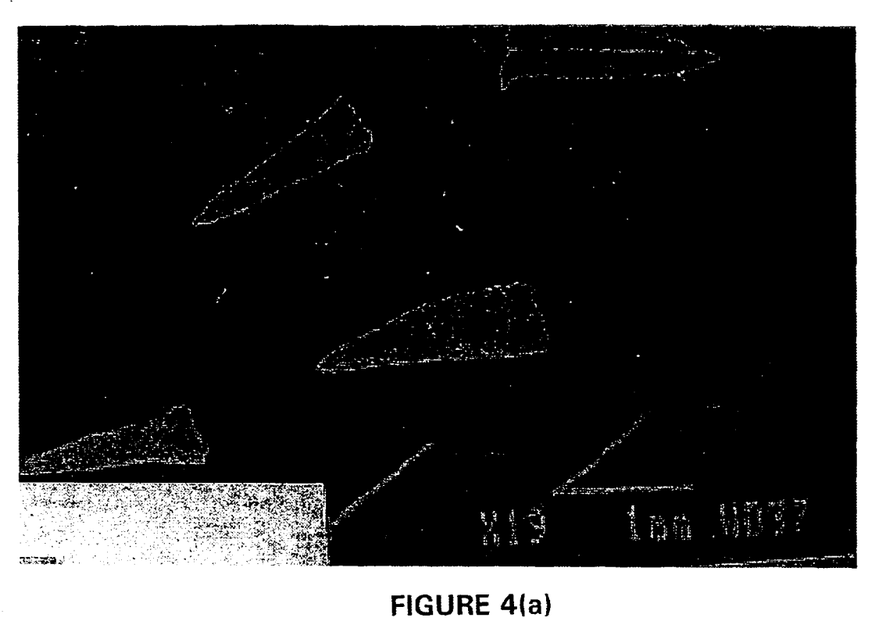

The Scanning Electron Micrograph of the cone is shown in FIG. 4(a) where the alloy and polymer were dissolved in ethanol and thorough agitation of the mixed solution was carried out for 10 minutes. The cones have been isolated as such by evaporating the mixed solution of the alloy-polymer in ethanol in the presence of magnetic field. The magnetic-polymer cones have dimensions up to 2 mm in length and 0.5 mm width.

Figure 4B:
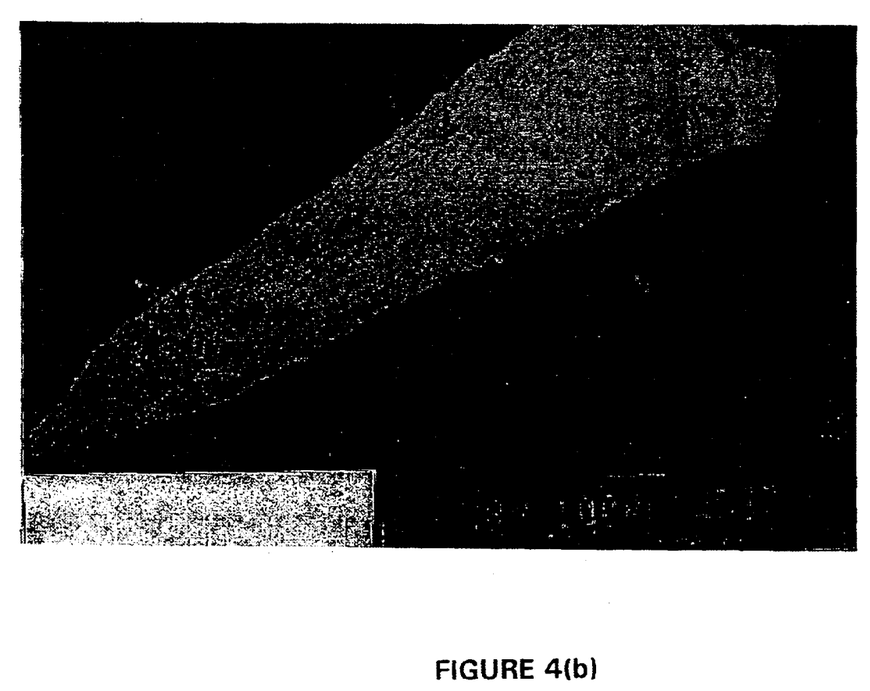
Figure 4C:
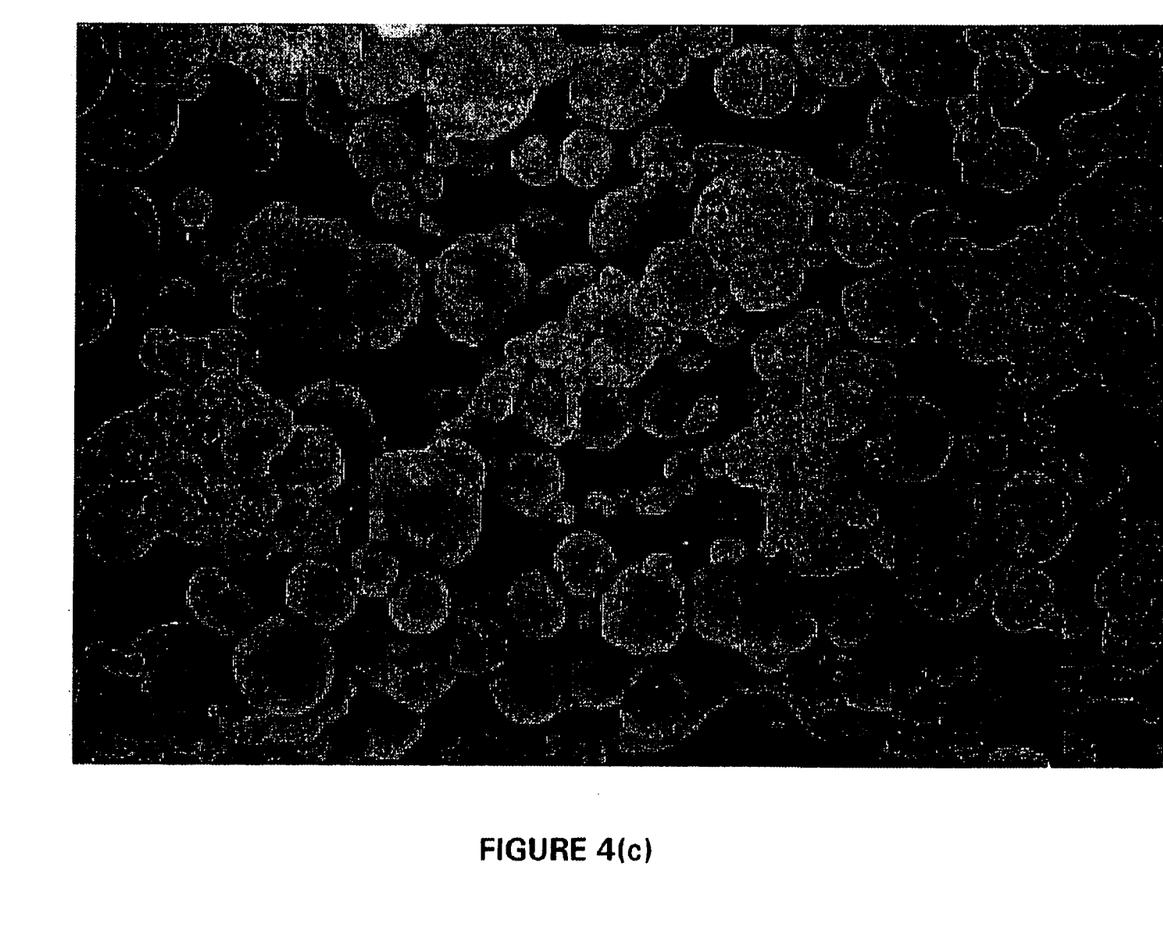

FIG. 4(b) depicts the magnified view of the Scanning Electron Micrograph of the cone. The micrograph shows that all the particles are substantially spherical in shape. As a result of thorough agitation of the alloy-polymer solution, the Fe—Cr alloy particles are uniformly coated with a layer of the polymer. The average particle size of the polymer coated alloy particles is 2.5 to 5 micrometer. Such spherical morphology of the coated particles is highly desirable for technological application.

Figure 5:
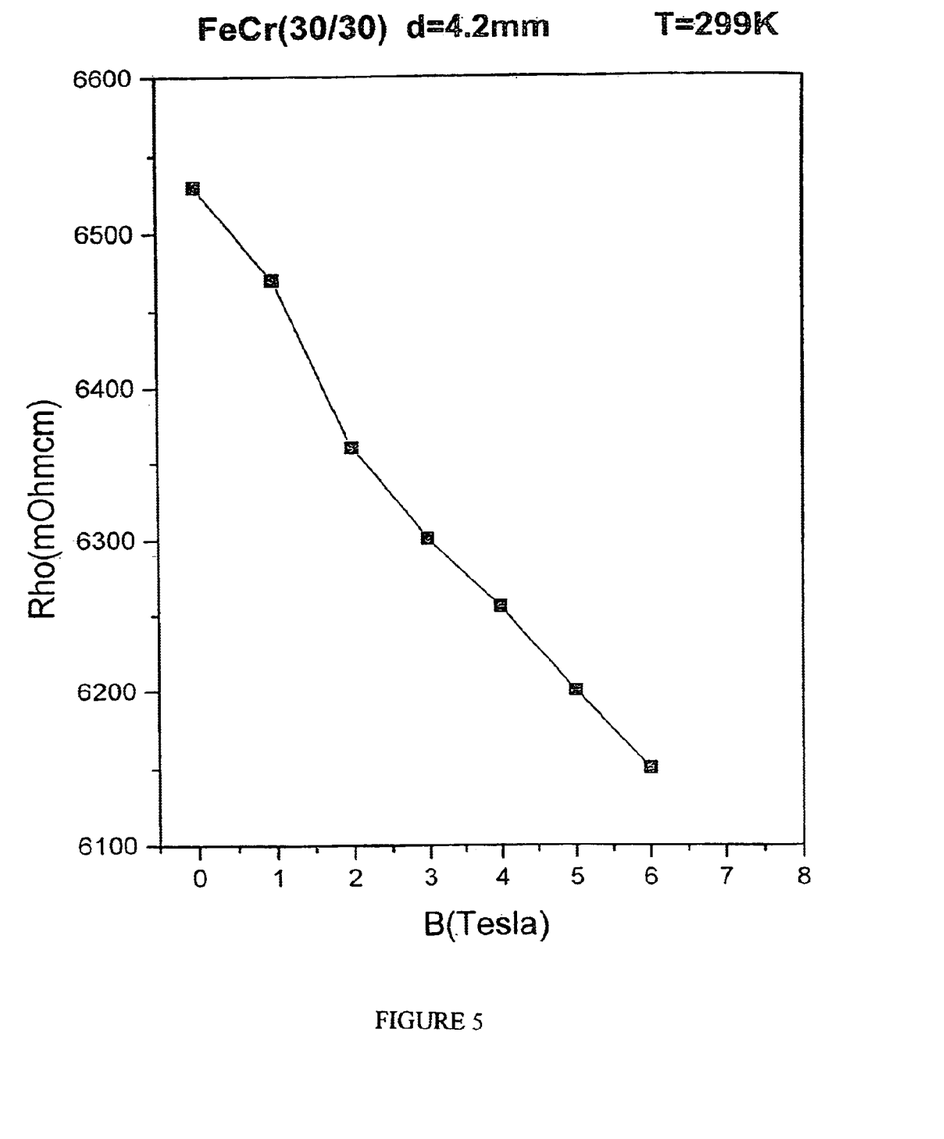
FIG. 5 depicts the magnetoresistance data

In the plot of resistivity as shown in FIG. 5, $\rho$ v/s Field, H in Tesla, a magneto-resistive ratio of the order of 7.9% is observed at high fields and at 299K. Such as observance of drop in MR ratio, especially at room temperature is highly desirable for commercial application of such magneto-resistive alloys.

The subject invention can better be understood with reference to the examples, which are for illustrative purposes and should not be construed to restrict the scope of the application.

EXAMPLES

Example 1

Fe—Cr alloy in the ratio of 74:26 of the mesh size of 150 and polyvinylpyrrolidone having average molecular weight of 40,000 was taken. The polymer was dissolved in 20 ml of ethanol, taken as a solvent in a round bottom flask. On complete dissolution of the polymer, the said amount of the alloy and 1.2 grams of the additive AB (30 wt % of the Alloy-polymer) is added to the clear polymer solution. The mixed solution is then allowed to undergo through agitation for 10 minutes, under ambient conditions. On completion of the process of agitation, the solution is transferred into an open petri-dish and the solvent is allowed to evaporate under the influence of a magnetic filed. The magnetic polymer material is isolated in the form of oriented cones.

Example 2

Fe—Cr alloy in the ratio of 70:30 of the mesh size of 150 and polyvinylpyrrolidone having average molecular weight of 40,000 was taken. The polymer was dissolved in 30 ml of ethanol, taken as a solvent in a glass container. On complete dissolution of the polymer, the said amount of the alloy and 1.3 grams of the additive as conducting carbon is added to the clear polymer solution. The mixed solution is then allowed to undergo sonication for 12 minutes, under ambient conditions. On completion of the process the solution is transferred into an open container and the is solvent allowed to evaporate under the influence of a magnetic filed. The magnetic polymer is isolated in the form of oriented cones, which are grounded in a mortar and pestle to obtain the said material in the powdered form. The said powder is then compacted in a 10 mm die to get the pellets.

The sample of Fe—Cr polymer as prepared in the examples 1 and 2 was characterized using the techniques as X-ray diffraction, magnetic measurements and Electron Microscopy. The powdered Fe—Cr/PVP was compacted using a 10 mm die and the pellet was used for X-Ray diffraction and magnetic measurement. On the other hand details of structure morphology was carried out on the Fe—Cr/PVP, isolated in the form of cones using Scanning Electron Microscopy. The compositional analysis was made on the alloy-polymer-additive composite using Electron probe micro analysis to ascertain the chemical composition. Magnetic measurement was carried out to study the magnetization with the variation of Field up to 5 Tesla at different temperatures viz 5K, 100K, 200K and 300K. Magneto-resistance measurements were carried out for the alloy-polymer sample with the additive. A drop in the magneto resistance of the order of 7.9% is observed fro the magnetic polymer at high fields of 5T and at room temperature.

The subject application is a mere statement of invention, where various modifications and alterations are possible without deviating from the scope of the invention, hence the present application should not be construed to restrict the scope of the invention.

We claim:

1. A magnetic polymer composite for read and write heads for use in magnetic storage devices, comprising
   60–90% by weight polyvinylpyrrolidone
   10–40% by weight of magneto resistive alloy; and
   5–30% by weight of conducting carbon.

2. The polymer composite as claimed in claim 1, wherein the said magneto-resistive alloys are selected from chromium-iron, chromium-cobalt or chromium-nickel.

3. The polymer composite as claimed in claim 1 wherein said composite is in the form of a powder.

4. A process for the preparation of a magnetic polymer composite, comprising:
   (a) dissolving polyvinylpyrrolidone in a solvent to obtain a clear colorless solution;
   (b) adding magneto-resistive alloy particles to said colorless solution;
   (c) simultaneously adding conducting carbon to said colorless solution;
   (d) agitating said solution obtained from step (c) at a frequency of 15–20 kHz for a period of 5–30 minutes to produce an evenly dispersed dispersion of alloy particles in said solution;
   (e) transferring said solution containing dispersed alloy particles to an open non-metallic container on a megneto-stirrer and allowing said solvent to evaporate until polyvinylpyrrolidone coated magneto resistive alloy composite is isolated from the non-metallic container in the form of cones.

5. The process as claimed in claim 4, wherein the said agitation is done in a sonicator.

6. The process as claimed in claim 4, wherein the said non-metallic container is a glass container.

7. The process as claimed in claim 4 wherein said polyvinylpyrrolidone coated magneto resistive alloy composite is isolated in the form of cones having dimensions of 1.5–2.5 mm in length and 0.3–0.6 mm in width.

8. The process as claimed in claim 4 wherein said dissolution and mixing of the polyvinylpyrrolidone results in effective coating of said alloy particles.

9. The particles as claimed claim 7 wherein said polyvinylpyrrolidone coated magneto resistive alloy composite isolated in the form of cones is ground to form a powder.

10. The process as claimed claim 7 wherein said polyvinylpyrrolidone coated magneto resistive alloy composite isolated in the form of cones is ground by a mortar and pestle.

11. The process as claimed in claim 9, wherein the said powder is pelletized in a 8–12 mm die by applying a pressure of 4–6 tons.

* * * * *

UNITED STATES PATENT AND TRADEMARK OFFICE
CERTIFICATE OF CORRECTION

PATENT NO.     : 6,627,101 B2
DATED          : September 30, 2003
INVENTOR(S)    : Solomon Sundar Manoharan et al.

It is certified that error appears in the above-identified patent and that said Letters Patent is hereby corrected as shown below:

<u>Title page,</u>
Item [30], Foreign Application Priority Data, "858/00" should read -- 859/DEL/00 --.

Signed and Sealed this

Eleventh Day of November, 2003

JAMES E. ROGAN
*Director of the United States Patent and Trademark Office*